(12) United States Patent
Shah (10) Patent No.: US 8,155,515 B2
(45) Date of Patent: Apr. 10, 2012

(54) METHOD AND APPARATUS FOR SHARING COMMON CAPACITY AND USING DIFFERENT SCHEMES FOR RESTORING TELECOMMUNICATIONS NETWORKS

(75) Inventor: Jasvantrai Shah, Richardson, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1555 days.

(21) Appl. No.: 10/747,646

(22) Filed: Dec. 29, 2003

(65) Prior Publication Data

US 2005/0157643 A1 Jul. 21, 2005

(51) Int. Cl.
*G02F 1/00* (2006.01)
(52) U.S. Cl. .............. 398/2; 398/5; 398/12; 398/17; 398/19
(58) Field of Classification Search ............. 398/4, 49, 398/2, 5, 12, 17, 19
See application file for complete search history.

(56) References Cited

U.S. PATENT DOCUMENTS

| | | | |
|---|---|---|---|
| 5,557,608 A * | 9/1996 | Calvignac et al. | 370/389 |
| 5,646,936 A * | 7/1997 | Shah et al. | 370/228 |
| 6,278,689 B1 * | 8/2001 | Afferton et al. | 370/223 |
| 6,792,174 B1 * | 9/2004 | Ramaswami | 385/17 |
| 6,813,241 B1 * | 11/2004 | Wang et al. | 370/228 |
| 6,882,765 B1 * | 4/2005 | Erickson et al. | 385/16 |
| 7,188,280 B2 * | 3/2007 | Shinomiya et al. | 714/43 |
| 7,274,869 B1 * | 9/2007 | Pan | 398/5 |
| 7,346,277 B2 * | 3/2008 | Atkinson et al. | 398/7 |
| 7,558,269 B2 * | 7/2009 | Le Pennec et al. | 370/395.42 |
| 7,688,732 B2 * | 3/2010 | Manzalini et al. | 370/235 |
| 7,852,754 B2 * | 12/2010 | Khanna et al. | 370/222 |
| 2001/0000700 A1 * | 5/2001 | Eslambolchi et al. | 370/217 |
| 2002/0018264 A1 * | 2/2002 | Kodialam et al. | 359/128 |
| 2002/0063916 A1 * | 5/2002 | Chiu et al. | 359/110 |
| 2002/0089712 A1 * | 7/2002 | Kang et al. | 359/110 |
| 2002/0109879 A1 * | 8/2002 | Wing So | 359/118 |
| 2002/0176131 A1 * | 11/2002 | Walters et al. | 359/118 |
| 2002/0184387 A1 * | 12/2002 | Yamaya et al. | 709/238 |
| 2003/0067655 A1 * | 4/2003 | Pedersen et al. | 359/152 |
| 2003/0185566 A1 * | 10/2003 | Nishi et al. | 398/56 |
| 2004/0107382 A1 * | 6/2004 | Doverspike et al. | 714/4 |

\* cited by examiner

*Primary Examiner* — Kenneth N Vanderpuye
*Assistant Examiner* — Hibret Woldekidan (57) ABSTRACT

A system and method for responding to a failure in a communications network. The failure is detected by a router, which then transmits data from the protection port. A signal is sent from the router to a optical cross-connect system indicating the failure and causing the optical cross-connect system to connect the protection port of the router to a working port of the OXC.

16 Claims, 9 Drawing Sheets

METHOD AND APPARATUS FOR SHARING COMMON CAPACITY AND USING DIFFERENT SCHEMES FOR RESTORING TELECOMMUNICATIONS NETWORKS

BACKGROUND

The present invention relates to communications networks and more specifically to failure response in communications networks.

Failures in communication networks, such as a fiber cut, require rapid response to prevent data loss and network slowdown. Optical Carrier (OC) links, such as OC-12, OC-48, and OC-192 carry high speed data across communications networks. As many as 160 OC Links can be compressed onto a fiber by a Dense Wavelength Division Multiplexer (DWDM), resulting in data transfer speeds as high as 1.6 trillion bits per second (Tbps). The high rate of data transfer requires efficient solutions to problems in transmission, such as breaks or equipment failure.

Accordingly, the data traffic is rerouted via an alternate path when a failure occurs. The data traffic can either be routed to another router or another DWDM. Routing traffic to another router can take between a few seconds and several minutes. Given the speed of the data traffic, rerouting to another router is not practical. Furthermore, even though rerouting to different DWDM is achieved at reasonable speeds (50 ms), data traffic cannot be rerouted when the cut occurs between the router and the DWDM.

To respond to failures between the router and the DWDM, additional links and routers are used. For example, a router may include a working port for transferring data and a protection port. Alternately, a router may be associated with a backup router for transferring data when the router fails. Optical Cross-Connect Systems (OXCs), include a Spare Physical Layer and a Spare Service Layer to be used during network failures. If a failure occurs between two OXCs, one OXC detects the failure and transmits the data using the Spare Physical Layer. If a failure occurs between the router and the OXC, the router detects the failure and the data is transmitted using either the protection port or the backup router. The protection port or backup router is connected by the OXC to the Spare Service Layer.

The extra capacity allows for fast restoration of the fiber optic network, but would result in very high costs due to adding the protection port and the Spare Physical Layer and the Spare Service Layer. For example, the costs of allocating additional resources is estimated to exceed $10 billion. Accordingly, what is needed is a system and method for restoring network failures quickly with minimal costs.

SUMMARY

A system and method are disclosed for responding to a failure in a communications system. The failure is detected by a router and the router transmits data using the protection port. The router then sends a signal to the optical cross-connect system which indicates the failure and causes the optical cross-connect to connect the protection port to the working port. Thus, the costs can be mitigated by transmitting low priority data from the protection port/backup router via the Spare Service Layer, and preempting the low priority data during a failure.

DETAILED DESCRIPTION

Figure 1:
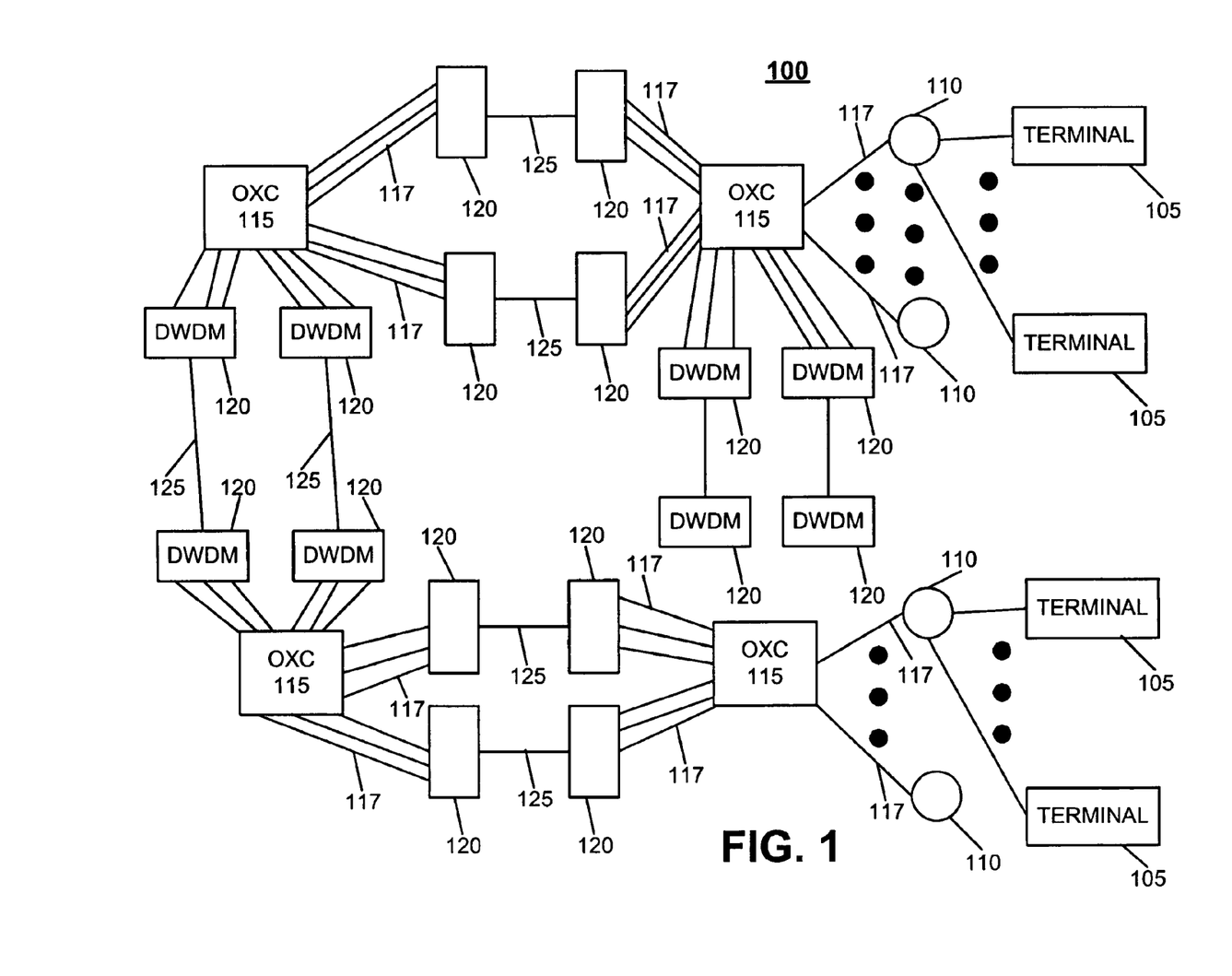
FIG. 1 is a block diagram of a communications network for transferring data.

Referring now to FIG. 1, there is illustrated a block diagram of a communications network 100 for transferring data from a first terminal 105 to a second terminal 105. The optical network 100 comprises any number of routers 110, optical cross-connect systems (OXC) 115, and Dense Wavelength Division Multiplexers (DWDM) 120. The routers 110 serve as gateways to the optical network 100 for any number of terminals 105. Information is transferred from terminals 105 to the router 110 in the form of packets. In addition to data, packets includes other information, such as the address of the destination terminal (destination address). The router 110 creates or maintains a table of the available routes and their conditions and uses this information along with distance and cost algorithms to determine the best route for a given packet.

The routers 110 are connected to OXCs 115 by any number of Optical Carrier (OC) links 117, such as OC-12, OC-48, and OC-192 links. OXCs are also connected together via the OC links 117 to form a network and establish connection paths between the routers 110. Each OXC 115 recieves any number of OC links 117 and connects incoming lines to outgoing lines to establish connection paths from the first router 110 to a second router 110.

The OCXs 115 are interconnected by any number of the OC links 117 that are received at the DWDM 120 and compressed onto a single fiber 125. The signals on the fiber 125 are then decompressed by a second DWDM 120 that places the signals onto the OC links 117. As of present date, a single DWDM can combine the signals from 160 OC links onto a single fiber 125. Where each OC link is an OC-192, the fiber 125 transmits at rates as high as 1.6 Tbps.

Because of the huge amount of data carried, effective and speedy response to failures is essential. Accordingly, the data traffic is routed via an alternate path during a failure. The data traffic can either be routed to another router 110 or another DWDM 120 as discussed below.

Figure 2A:
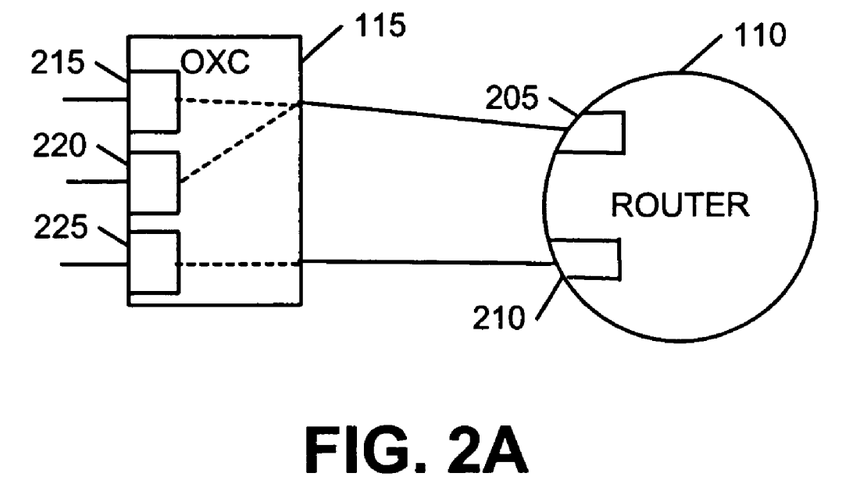
FIG. 2A is a block diagram of an optical cross-connect system (OXC) connected to a router.

Referring now to FIG. 2A, the router 110 connected to the OXC 115. The router 110 includes a working port 205 and a protection port 210. The OXC 115 is connected to the DWDM 120 via OXC working ports 215, a spare physical layer 220, and a spare service layer 225. The working ports 205 and 215 are used to transmit data from and to the router 110. If a failure occurs between the OXC 115 and the DWDM 120, in FIG. 1, then the OXC 115 detects the failure and connects the working port 205 to the Spare Physical Layer 220. If a failure occurs between the router 110 and the OXC 115, the router 110 detects the failure and uses the protection port 210 to transmit the data. The protection port 210 is connected by the OXC 115 to the Spare Service Layer 225.

Figure 2B:
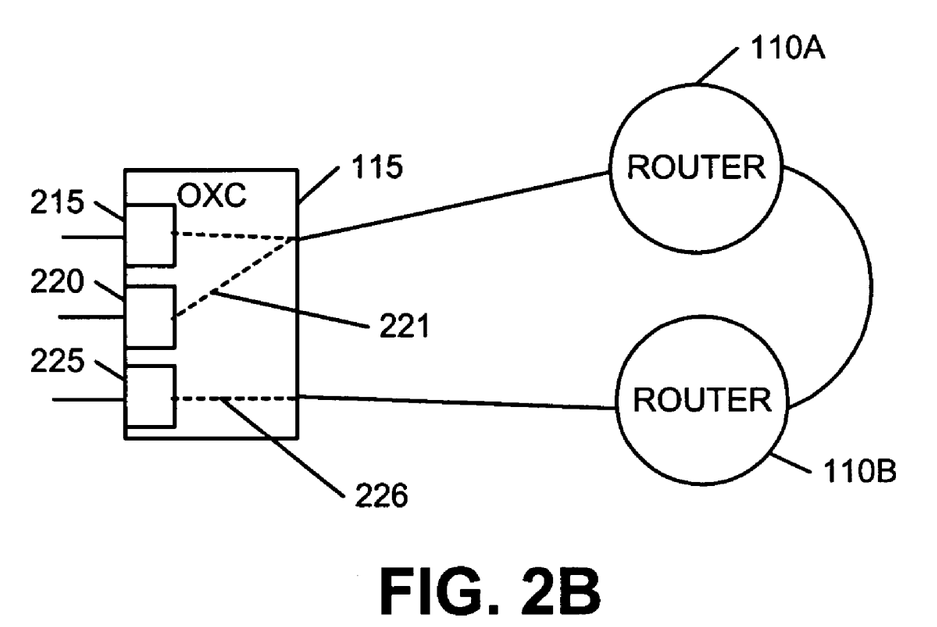
FIG. 2B is a block diagram of an optical cross-connect system (OXC) connected to a router and a backup router.

Referring now to FIG. 2B, there is illustrated a block diagram of a router 110A and a router 110B, both of which are connected to an axe 115. The OXC 115 is connected to the DWDM 120, as shown in FIG. 1, via OXC working ports 215, Spare Physical Layer 220, and Spare Service layer 225. The primary router 110A is used to transmit data via the OXC working port 215. If a failure occurs between the OXC 115 and DWDM 120, then the OXC 115 detects the failure and connects the primary router 110A to the Spare Physical Layer 220 via path 221. If a failure occurs between the routers 110 and the OXC 115, then the router 110A detects the failure and alerts the router 110 6. The router 110 6 is used to transmit the data and is connected by the OXC 115 to the Spare Service Layer 225 via path 226.

The extra capacity allows for fast restoration of the network 100. The costs can be mitigated by transmitting low priority data from the protection port 210 of router 110B via the Spare Service Layer 225 and preempting the low priority data during a failure as needed.

Figure 3A:
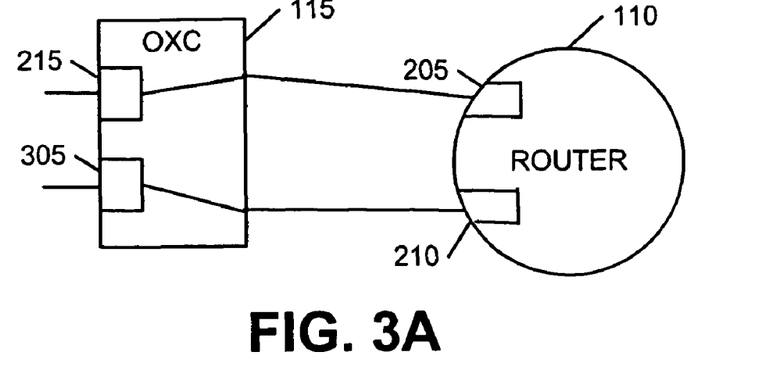
FIG. 3A is a block diagram of the connections of the OXC where no failure is detected and a protection port is used.
Figure 3B:
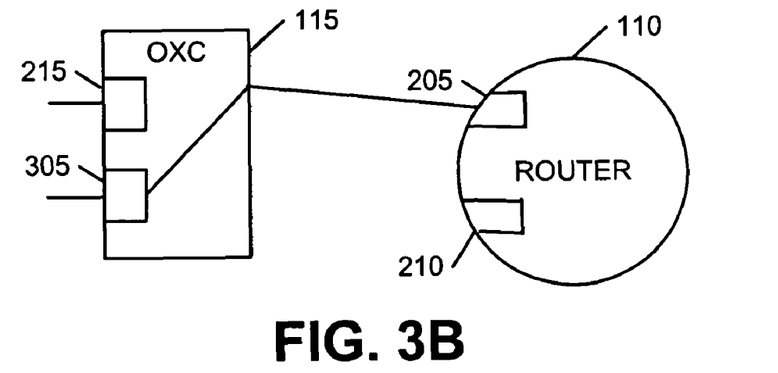
FIG. 3B is a block diagram of the connections of the OXC where the OXC has detected a failure and a protection port is used.
Figure 3C:
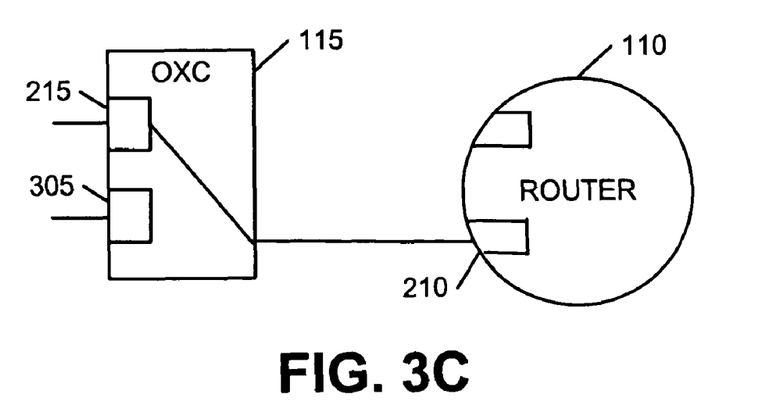
FIG. 3C is a block diagram of the connections of the OXC where the router has detected a failure and a protection port is used.

Referring now to FIGS. 3A-3C, there is illustrated a block diagram of an OXC 115 with a Spare Port 305 connectable to either the working port 205 or the protection port 210. Referring to FIG. 3A, the connections of the OXC 115 are illustrated where no failure is detected. The working port 205 of the router 110 is connected to the working port 215 of OXC 115. The protection port 210 of the router 110 is connected to the spare port 305 of the OXC 115. The protection port 210/spare port 305 connection can be used to transmit lower priority data that can be preempted when a failure is detected.

Referring now to FIG. 3B, the connections of the OXC 115 are illustrated where the OXC 115 has detected a failure between the OXC 115 and the DWDM 120. When the OXC 115 detects a failure, the working port 205 of the router 110 is connected to the spare port 305 of the OXC 115. Any data carried on the protection port 210/spare port 305 connection, prior to the failure, is preempted.

Referring now to FIG. 3C, the connections of the OXC 115 are illustrated where the router 110 has detected a failure between the OXC 115 and the router 110. When the router 110 detects a failure, the protection port 210 is connected to the working port 215 of the OXC 115 and the protection port 210/working port 215 connection is used to transmit the data. Any data carried on the protection port 210/spare port 305 connection, prior to the failure, is preempted. When a failure occurs between the router 110 and the OXC 115, the failure is detected by the router 110. However, in order for the OXC 115 to connect protection port 210 to the working port 215 of the OXC 115 in response to the failure, a signal is sent from the router 110 to the OXC 115, alerting the OXC 115.

Figure 4:
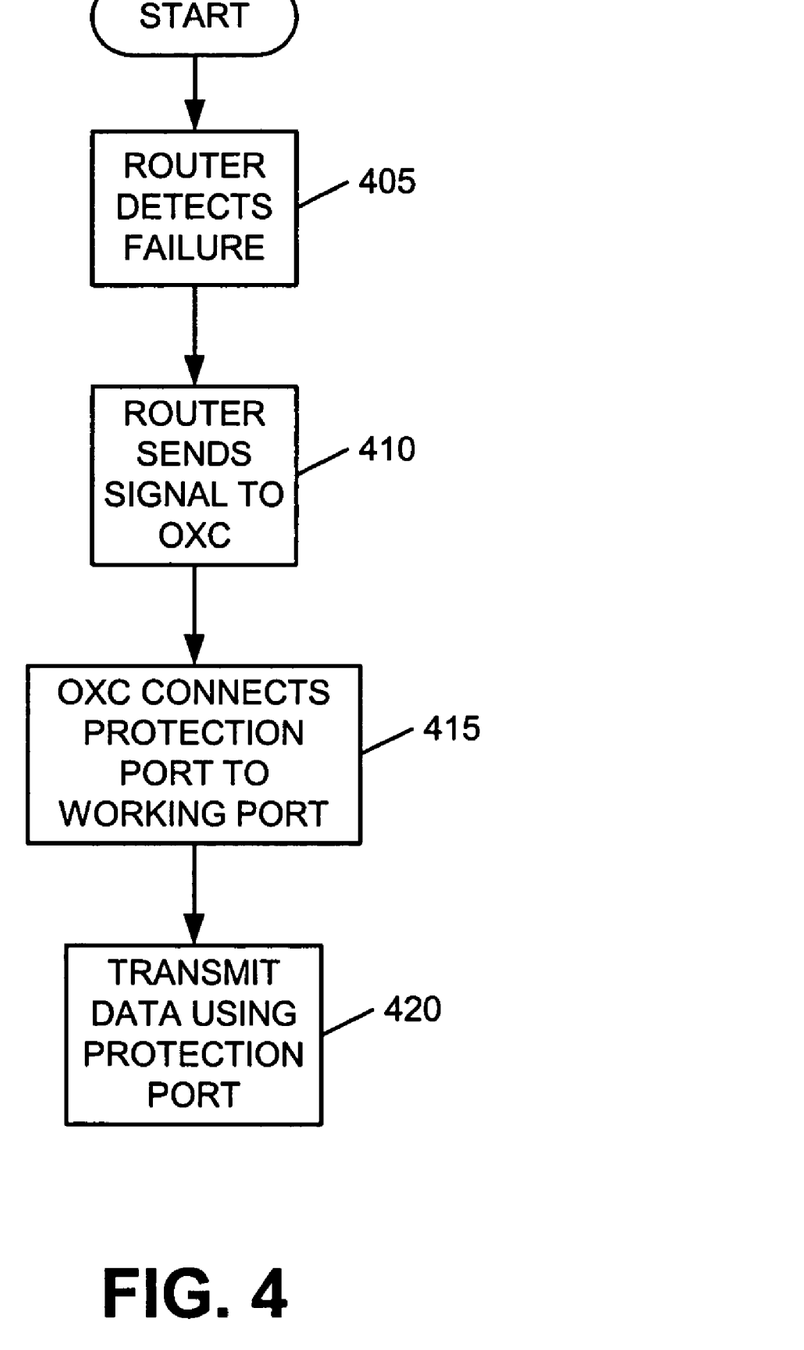
FIG. 4 is a signal flow diagram describing the operation of the OXC and the router.

Referring now to FIG. 4, there is signal flow diagram describing the operation of the router 110 and the OXC 115. At step 405, the router 110 detects a failure between the router 110 and the OXC 115. At step 410, the router 110 alerts the OXC 115 of the failure of the working port 205 and directs the OXC 115 to connect the protection port 210 to the working port 215 of the OXC 115. The OXC 115 responds by connecting the protection port 210 to the working port 215 of the OXC 115 (step 415). At Step 420, the router 110 transmits data using the protection port 210 to the OXC 115.

The signal transmitted at step 410 can either be transmitted in-band or out-of-band. For example, the router 110 and the OXC 115 can be associated with Internet Protocol (IP) addresses, and the router 110 can send a message to the IP address associated with the OXC 115. Alternatively, the signal transmitted at step 415 can be transmitted using an in-band Synchronous Optical Network (SONET) message.

Figure 5A:
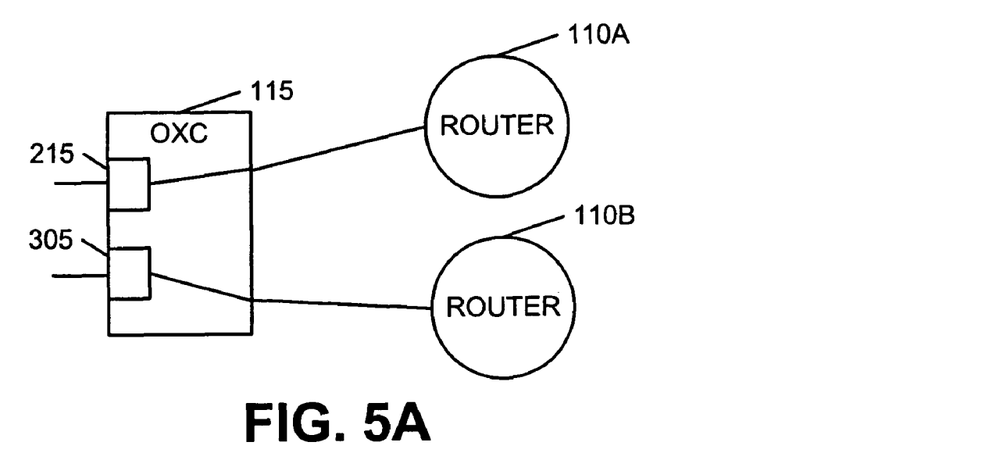
FIG. 5A is a block diagram of the connections of the OXC where no failure is detected and a backup router is used.

Referring to FIG. 5A, the connections of the OXC 115 are illustrated where no failure is detected. The router 110A is connected to the working port 215 of the OXC 115 and the router 110B is connected to the spare port 305. The router 110B/spare port 305 connection can be used to transmit lower priority data that can be preempted when a failure is detected.

Figure 5B:
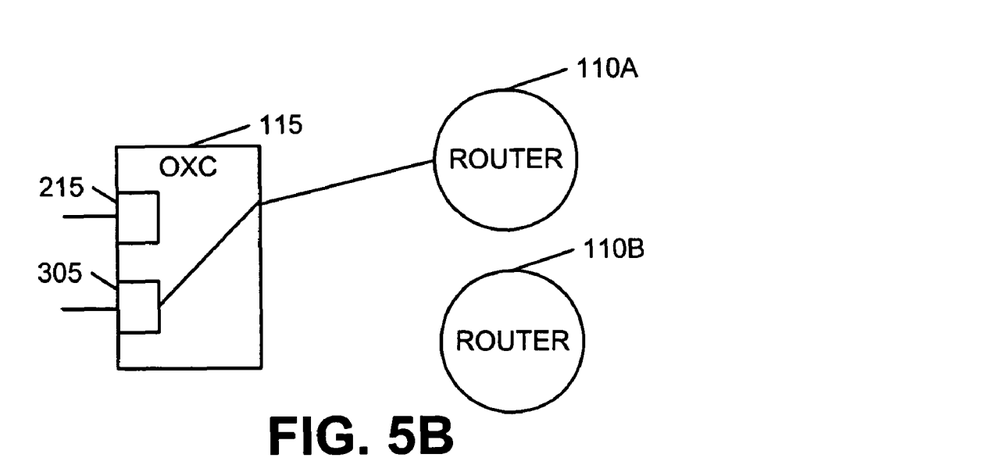
FIG. 5B is a block diagram of the connections of the OXC where the OXC has detected a failure and a backup router is used.

Referring now to FIG. 5B, the OXC 115 has detected a failure between the OXC 115 and the DWDM 120 connected to the working port 215. When the OXC 115 detects a failure, the router 110A is connected to the spare port 305. Any data carried on the router 110B/spare port 305 connection, prior to the failure, is preempted.

Figure 5C:
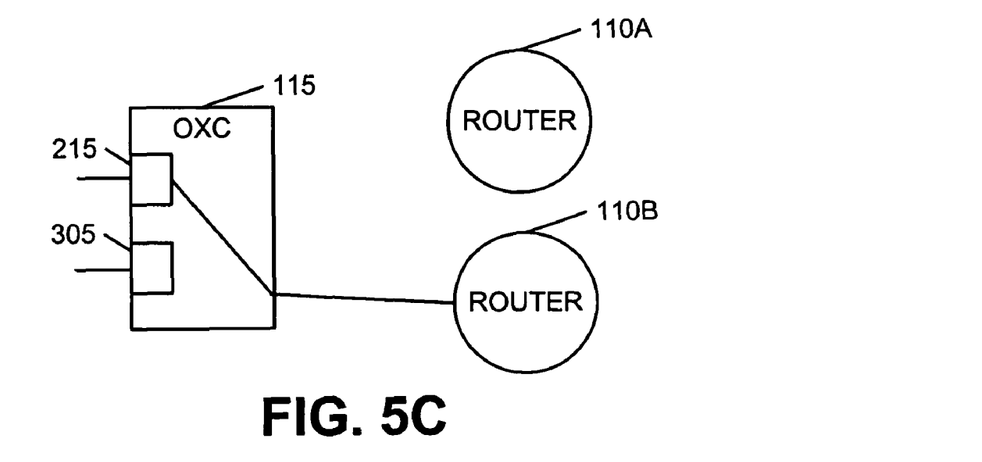
FIG. 5C is a block diagram of the connections of the OXC where the router has detected a failure and a backup router is used.

Referring now to FIG. 5C, router 110B has detected a failure of the router 110A. When the router 110B detects failure of the router 110A, the router 110B is connected to the working port 215 of the OXC 115 and the router 110B/ working port connection 215 is used to transmit the data. Any data carried that was carried on the router 110B/spare connection 305, prior to the failure, is preempted.

When a failure occurs with the router 110A, the failure is detected by the router 110B. However, in order for the OXC 115 to connect the router 110B to the working port 215 of the OXC 115 in response to the failure, a signal is sent from the router 110B to the OXC 115, indicating the same.

Figure 6:
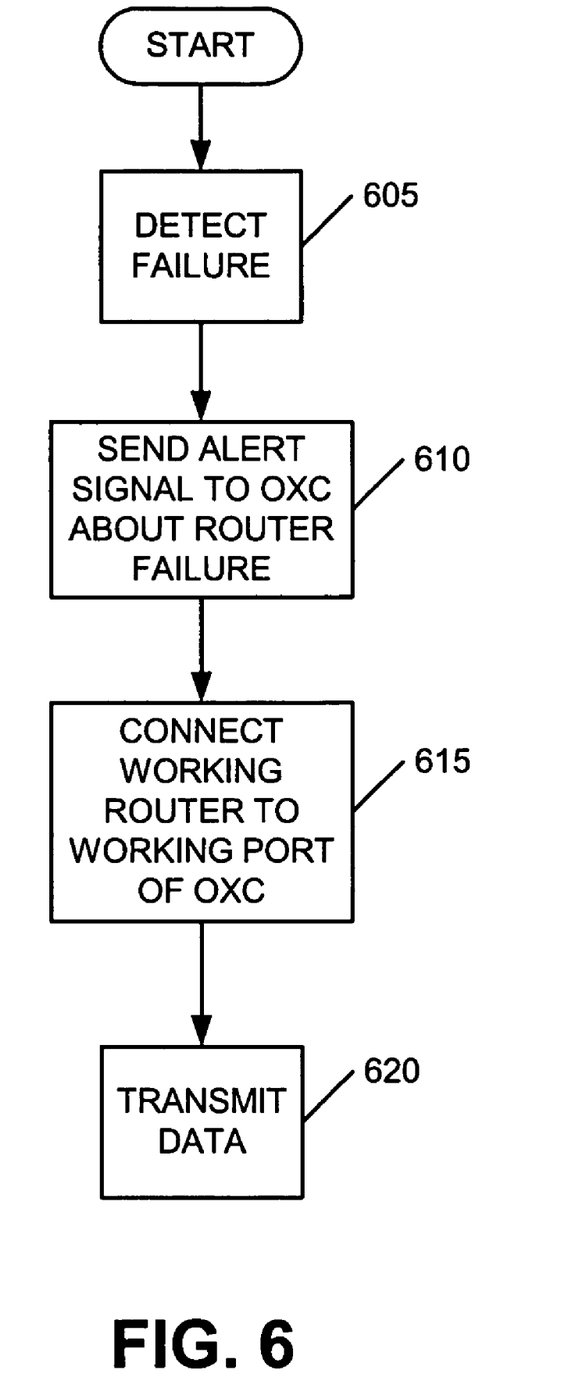
FIG. 6 is a signal flow diagram describing the operation of the OXC and the router.

Referring now to FIG. 6, there is signal flow diagram describing the operation of the router 110B and the OXC 115 relating to FIGS. 5A-5C. At step 605, the router 110B detects a failure of the router 110A. Detection of the failure by the router 110B can occur, for example, by means of a signal sent from the router 110A to the router 110B indicating the same. At step 610, the router 110B alerts the OXC 115 of the failure of the router 110A. At step 615 the router 110B directs the OXC 115 to connect the router 110B to the working port 215 of the OXC 115 and the OXC 115 responds by connecting the router 110B to the working port 215 of the OXC 115. At step 620, the router 110B transmits the data.

The signal transmitted during step 610 can either be transmitted in-band or out-of-band. For example, the router 110B and the OXC 115 can be associated with Internet Protocol (IP) addresses. The router 110B can send a message to the IP address associated With the OXC 115. Alternatively, the signal transmitted during step 610 can be Transmitted using an in-band Synchronous Optical Network (SONET) message.

Figure 7A:
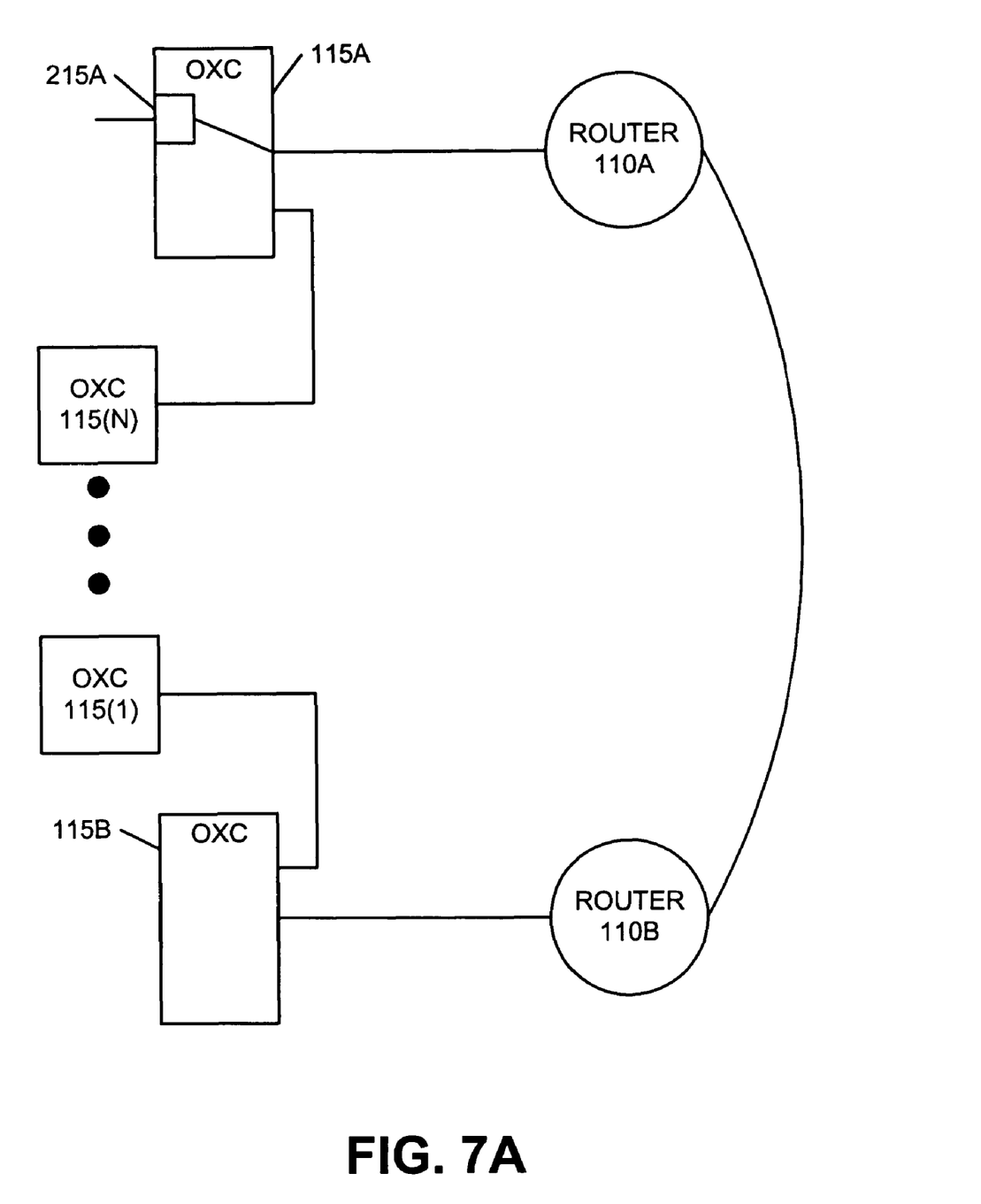
FIG. 7A is a block diagram of the connections of the OXC, where no failure is detected and a backup router is connected to a second OXC.
Figure 7B:
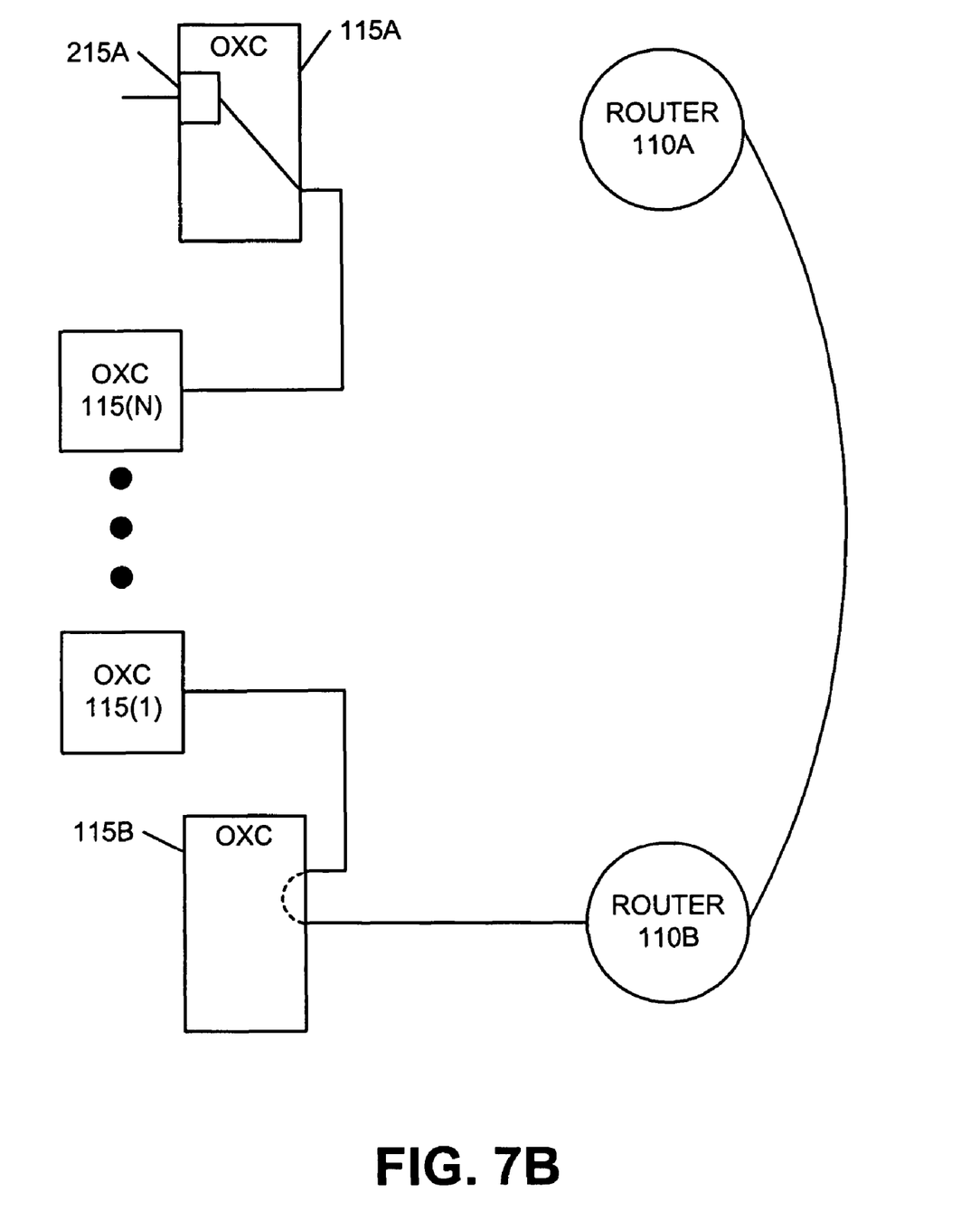
FIG. 7B is a block diagram of the connections of the OXC, where a failure is detected and a backup router is connected to a second OXC.

The foregoing describes cases where the router 110A and the router 110B can be connected to the same OXC 115. It is noted that the backup router 110B can be connected to another OXC 115. Referring now to FIGS. 7A and 7B, there are illustrated block diagrams of routers 110A connected to a OXC 115A and routers 110B connected to an OXC 110B connected to a OXC 115B.

Referring to FIG 7A, there is illustrated the case where no failure is detected. The router 110A is connected to the OXC 115A and transmits data from the working port 215A of the OXC 115A. The router 110B is connected to the OXC 115B. The OXC 115A and the OXC 115B and interconnected via any number of intervening OXCs, 115(1)...115(N).

Referring now to FIG. 7B, there is illustrated the OXC connections where the router 110B has detected the failure of the router 110A. Data from the router 110B is received by the OXC 115B. A free channel is established between the OXC 115B, each intervening OXCs 115(1)...115(N) and the OXC 115A. The data is transmitted from the OXC 115B to the OXC 115A via the free channel established over the intervening OXCs 115(1)...115(N). The OXC 115A connects the free channel to the working port 215A of OXC 115A and transmits the data therefrom.

Figure 8:
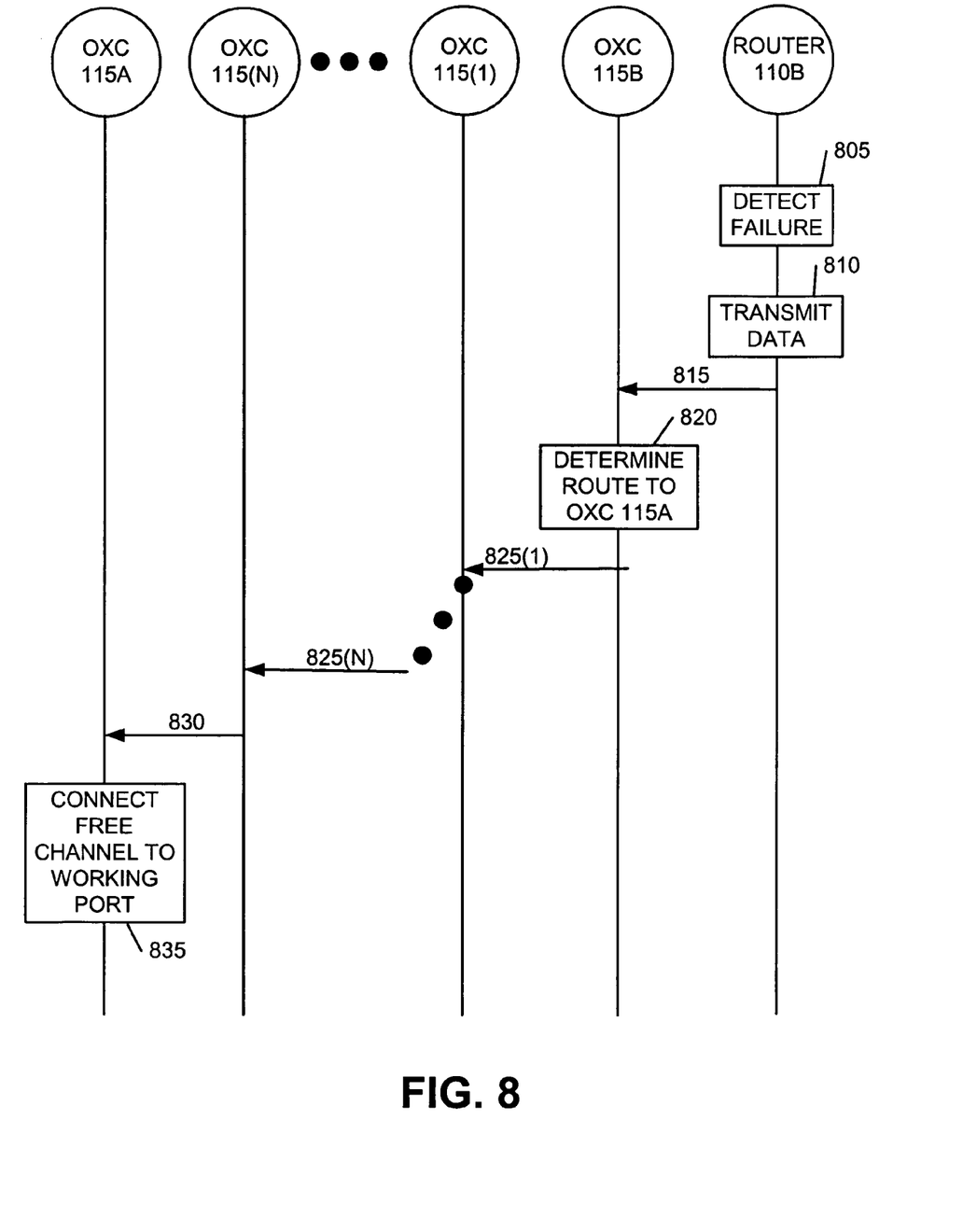
FIG. 8 is a signal flow diagram describing the operation of the OXC and the router.

Referring now to FIG. 8, there is illustrated a signal flow diagram describing the operation of the routers 110B, the OXCs 115(A), 115(B), 115(1)...115(N). At step 805, the router 110B detects the failure of the router 10A and at step 810 the data is transmitted from the router 110B to the OXC 115B. The router 110B sends a message signal 815 to the OXC 115B indicating the detected failure and directing the OXC 115B to establish a free channel to the OXC 115A. At step 820, the OXC 115B determines the route to the OXC 115A and sends a message signal 825(1) to the next intervening OXC 115(1) along the determined route. Message signals 825(1)...825(N) are sent from each intervening OXC 115(1)...115(N) to the next intervening OXC until a connection is established with the OXC 115A. At step 835, the last intervening OXC 115(N) sends a message signal 830 to the OXC 115A directing the OXC 115A to connect the free channel to the working port 215A of the OXC 115A. The data is then transmitted from the router 110B via the free channel through the working port 215A of the OXC 115A.

Although preferred embodiments of the present inventions have been illustrated in the accompanying drawings and described, it will be understood that the inventions are not limited to the embodiments disclosed, but are capable of numerous rearrangements, modifications, substitutions, and equivalents thereof without departing from the spirit of the invention as set forth and defined by the scope of the following claims.

What is claimed is:

1. An optical cross-connect system, located in an optical network, the optical cross-connect system comprising:
   a spare port to transmit low priority data to or from a router that is external to the optical cross-connect system; and
   a working port to transmit high priority data to or from a primary router that is external to the optical cross-connect system,
   where the working port is connected to the router responsive to receiving, from the router, an out-of-band signal indicating a failure of the primary router, where the out-of-band signal is received via an Internet Protocol address associated with the optical cross-connect system, and
   where the transmission of the low priority data, to or from the router, is to be preempted by the transmission of the high priority data, to or from the router, in response to the failure of the primary router.

2. The optical cross-connect system of claim 1, where the out-of-band signal is received based on the router receiving a message, from the primary router, indicating the failure of the primary router.

3. The optical cross-connect system of claim 1, where the failure of the primary router corresponds to the first failure of the primary router and the out-of-band signal corresponds to a first signal indicating the first failure of the primary router, and where the working port of the optical the cross-connect system is connected to the router in response to one of: the first signal being received at the optical cross-connect system, or a second signal being received at the optical cross-connect system, the second signal indicating a second failure of the primary router.

4. The optical cross-connect system of claim 3, where the second signal includes an in-band signal.

5. The optical cross-connect system of claim 4, where the in-band signal includes a Synchronous Optical Network (SONET) message, and where the message is received from the router.

6. The optical cross-connect system of claim 1, where, prior to receiving the out-of-band signal indicating the failure of the primary router, the router is connected to the spare port and the primary router is connected to the working port, and where the primary router is connected to the spare port based on a failure between the optical cross-connect system and a Dense Wavelength Division Multiplexer.

7. A method implemented by an optical cross-connect system (OXC), located in an optical network, the method comprising:
   transmitting, from a spare port of the OXC, low priority data to or from a router that is external to the OXC;
   transmitting, from a working port of the OXC, high priority data to or from a primary router that is external to the OXC;
   connecting the working port of the OXC to the router in response to receiving, from the router, an out-of-band signal indicating a failure of the primary router, the out-of-band signal being received via an Internet Protocol address associated with the OXC; and
   preempting the transmission of the low priority data, to or from the router, by the transmission of the high priority data, to or from the router, in response to the failure of the primary router.

8. The method of claim 7, where the failure of the primary router corresponds to a first failure of the primary router and the out-of-band signal corresponds to a first signal indicating the first failure of the primary router, and where the working port of the OXC is connected to the router in response to one of: the first signal being received at the OXC, or a second signal being received at the OXC from the router, the second signal indicating a second failure of the primary router.

9. The method of claim 8, where the second signal includes a Synchronous Optical Network (SONET) message.

10. The method of claim 7, where, prior to receiving the out-of-band signal indicating the failure of the primary router, the router is connected to the spare port and the primary router is connected to the working port, the method further comprising: connecting the primary router to the spare port based on a failure between the OXC and a Dense Wavelength Division Multiplexer.

11. The method of claim 7, where the out-of-band signal is received based on the router receiving a message, from the primary router, indicating a failure of the primary router.

12. An optical cross-connect system, located in an optical network, the optical cross-connect system comprising:
   a spare port to transmit low priority data to or from a router that is external to the optical cross-connect system; and
   a working port to transmit high priority data to or from a primary router that is external to the optical cross-connect system,
   where the working port is connected to the router responsive to receiving, from the router, an in-band signal indicating a failure of the primary router, the in-band signal including a Synchronous Optical Network (SONET) signal, and where the transmission of the low priority data, to or from the router, is to be preempted by the transmission of the high priority data, to or from the router, in response to the failure of the primary router.

13. The optical cross-connect system of claim 12, where the failure of the primary router corresponds to the first failure of the primary router and the in-band signal corresponds to a first signal indicating the first failure of the primary router, and where the working port of the optical the cross-connect system is connected to the router in response to one of: the first signal being received at the optical cross-connect system, or a second signal being received at the optical cross-connect system, the second signal indicating a second failure of the primary router.

14. The optical cross-connect system of claim 13, where the second signal includes a message, from the router, addressed to an Internet Protocol address associated with the optical cross-connect system.

15. The optical cross-connect system of claim 12, where, prior to receiving the in-band signal indicating the failure of the primary router, the router is connected to the spare port and the primary router is connected to the working port, and where the primary router is connected to the spare port based on a failure between the optical cross-connect system and a Dense Wavelength Division Multiplexer.

16. The optical cross-connect system of claim 12, where the in-band signal is received based on the router receiving a message, from the primary router, indicating a failure of the primary router.

* * * * *